United States Patent [19]

Unfors

[11] Patent Number: 5,761,270
[45] Date of Patent: Jun. 2, 1998

[54] METHOD AND APPARATUS FOR MEASURING X-RAY RADIATION

[75] Inventor: Tomas Unfors, Billdal, Sweden

[73] Assignee: Unfors Instruments AB, Sweden

[21] Appl. No.: 605,151

[22] PCT Filed: Sep. 8, 1994

[86] PCT No.: PCT/SE94/00837

§ 371 Date: Mar. 4, 1996

§ 102(e) Date: Mar. 4, 1996

[87] PCT Pub. No.: WO95/07599

PCT Pub. Date: Mar. 16, 1995

[30] Foreign Application Priority Data

Sep. 9, 1993 [SE] Sweden ............................ 9302909

[51] Int. Cl.$^6$ ........................................ H05G 1/46
[52] U.S. Cl. ................................. 378/207; 378/98
[58] Field of Search ............... 250/370.07, 370.06; 378/108, 98, 207

[56] References Cited

U.S. PATENT DOCUMENTS

| | | | |
|---|---|---|---|
| 4,097,736 | 6/1978 | Jacobson et al. | 250/252 |
| 4,355,230 | 10/1982 | Wilson et al. | 250/252.1 |
| 4,361,900 | 11/1982 | Siedband | 378/98 |
| 4,400,821 | 8/1983 | Aichinger et al. | 378/97 |
| 4,697,280 | 9/1987 | Zarnstorff et al. | 378/207 |
| 4,843,619 | 6/1989 | Sheridan | 378/207 |
| 4,935,950 | 6/1990 | Ranallo et al. | 378/207 |
| 5,267,295 | 11/1993 | Strömmer | 378/97 |

FOREIGN PATENT DOCUMENTS

| | | |
|---|---|---|
| 0045156 | 2/1982 | European Pat. Off. . |
| 0402578 | 12/1990 | European Pat. Off. . |
| 1476623 A1 | 4/1989 | U.S.S.R. ............ 378/207 |

*Primary Examiner*—Constantine Hannaher
*Attorney, Agent, or Firm*—Samuels, Gauthier, Stevens & Reppert

[57] ABSTRACT

Method and instrument for measuring X-ray radiation, for generating a value representative of the radiation in the form of an electric signal, such that the radiation at the measurement instance is caught by two photo-electric units each receiving the radiation after its passage through filters having mutually different degrees of absorption. The radiation value is computed on the basis of a ratio between the two generated electric signals. Adaptation of the signal intensity to a processing range is made, which constitutes a lesser part of the total intensity range of the signals generated by the radiation, by means of an amplifier device with a variable degree of amplification, by sensing the signal intensity after the amplifier device. The amplifier device is designed as a pre-amplifier which is maintained at a fixed degree of amplification and is in series therewith, terminal amplifiers, which are adjusted in their degrees of amplification in order to give the signals said intensity adapted to the operational range. By varying the signal processing, the method/instrument may be adapted for generation of measurement values correlated to parameters including kVp, X-ray dose, exposure time and curve-shape.

12 Claims, 1 Drawing Sheet

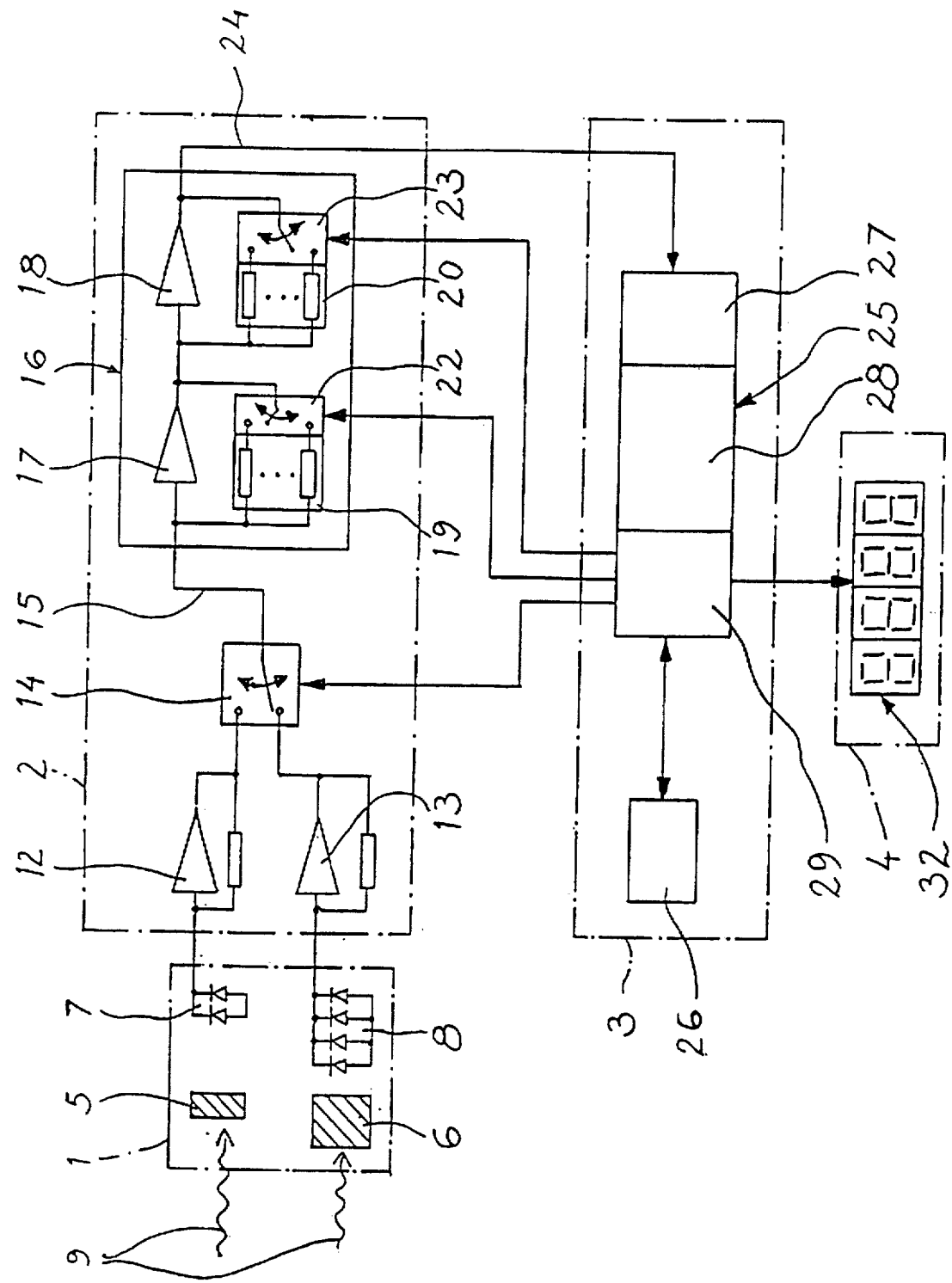

METHOD AND APPARATUS FOR MEASURING X-RAY RADIATION

BACKGROUND OF THE INVENTION

1. Technical Field

The invention relates to measurement of X-ray radiation as regards certain values and characteristics that are important to recognize in conjunction with exposure from an X-ray instrument. The invention thereby pertains to a method for such measurement as well as an instrument for carrying out the method.

2. Prior Art

The energy in the radiation from an X-ray tube is usually expressed as a kiloVolt-level of radiation peaks representing the radiation of the highest energy. Said energy varies, namely, with time when an exposure of an X-ray film takes place, whereby the peak-levels decide the light and contrast of the picture registered electronically or on a film. This value is usually denoted kVp (kilo Volt peak) and this denotation will also be used in the following. The energy of the radiation is namely dependent on the instantaneous voltage: kVp, which is introduced over the X-ray tube during the exposure. A desired radiation energy and thereby characteristics of exposure may thus be set by choosing the voltage of the X-ray instrument.

It has however been shown that other factors than the voltage also decide the energy of the radiation, so that full correspondence between the set voltage level and the radiation energy is not always obtained. To a large extent, therefore, direct measurement of the peak values of the radiation energy by a particular measurement is used instead whereby the X-ray instrument may be adjusted for correct exposure regardless of the correlation between set voltage and true radiation energy.

Methods and instruments for such measurements are previously known from U.S. Pat. No. 4,355,230 and 4,697,280 (Wilson et al and Zarnstorff et al) respectively. The X-ray radiation from the tube is thereby allowed to pass through two absorbing filters having different absorption levels, normally accomplished by having the filters made with different thicknesses. The radiation after the filters is absorbed by photo-diodes and the current generated in these diodes is led to an instrument which, based on the ratio between the registered levels, indicates the radiation energy expressed as a kVp-value. The generation of this indication requires an amplification of the output current of the photo-diodes in order to carry out the computation of said ratio and its correlation to a corresponding kVp-value as well as an indication of the same. Due to the wide limits within which the radiation energy may exist, this amplification must be given such an adaptation in degree of amplification, that the range within which the computation is to be carried out is limited to the capacity of the computation instrument. Such an adaptation of the instrument is achieved according to U.S. Pat. No. 4,355,230 by having the first exposure of the instrument carried out in such a way that it may be adapted to a correctly limited measurement range before a second exposure is carried out for generating the measurement value. In U.S. Pat. No. 4,697,280, the adaptation is carried out during the measuring sequence by firstly determining the main level of the diode voltages, whereafter each of these is led to an amplifier whose degree of amplification is commonly adjusted, so that the level of the output signal falls within the working range of the instrument.

The first mentioned method suffers from the drawback that a particular exposure must be carried out before the actual measurement is made, which results in a certain time-loss and a longer operation of the X-ray instrument, something which should be avoided for several reasons. In the second-mentioned method, a time period of such duration, that a peak value for the radiation or the entire exposure may have been passed before the actual measurement is made, is required for determining and setting the amplification level. This may render usage of the method impossible when using very short exposure times, such as down to 5–10 milliseconds. Furthermore, the common adjustment of the amplifiers may result in a lack of accuracy for one of the amplifiers if the voltage levels from both diodes are very different.

The importance of being able to determine the energy level in the exposure has been described. There are however other values which are of interest when using X-ray in diagnostics. Such a value is the dose amount during an exposure, and thus the amount of radiation, to which the patient is exposed. The size of the dose amount may be expressed as the ability to ionize air, through which the radiation passes. This fact has been used to create a dosimeter, which comprises an air-filled chamber, through which the radiation passes. A value of the size of the dose may then be obtained by measuring the extent to which the ionized air can conduct electric current. Such an instrument however becomes complicated and delicate and requires access to a high voltage electric current which offers an additional complication. Furthermore, an instrument of this kind depends on external factors such as temperature and air pressure. Dosimeters have also been designed which are based on measurement by semi-conductor elements. However, these elements suffer from other drawbacks and particularly lack linearity between the produced signal and the dose value.

Another value of interest for measurement is the exposure time, or in other words the time duration during which the radiation is active during an exposure. Due to the fact that the energy in the radiation successively increases and also successively ceases, one is usually not at all interested in how long the radiation lasts, but the exposure time is usually expressed as the time during which the radiation is above a certain energy level. This energy level is usually set to 75% of the mean level for the maximum energy level. In order to thereby be able to start the measurement exactly when this minimum value is reached, as well as stop it when the energy level falls below this value, a very fast-working instrument is required. Such a speed cannot be achieved with the aforementioned known principle. A useful value can be obtained if a trimming is carried out through several exposures.

Finally, characteristics such as the curve-shape for the continuous energy levels of the exposure, may be of interest for observation. Certain peculiarities in the curve-shape may namely indicate errors or the beginning of a malfunction in the radiation instrument. Here too, it is necessary to use a very fast-working instrument which may be connected to a printer or an oscilloscope.

One may thus draw the conclusion that several different instruments, and partly very complicated ones, are required in order to obtain these values and characteristics. There are however still difficulties in achieving such speed in the measurements that a fully representative result may be obtained.

SUMMARY OF THE INVENTION

In the present invention the selection of the degree of amplification is made by having a number of terminal amplifiers arranged with a gradually adjustable degree of amplification. At each measurement instance, the degree of amplification adapted to the signal intensity is connected with switches when the respective main level of the signals has been determined. Such a switch may operate very quickly and the change of the amplification may take place during a time period of about 0.05 milliseconds, which enables operation even for the shortest existing exposure times. Furthermore, it is possible to control the switches differently for the two signals so that the amplification may be individually adapted to the voltage level of the respective signals. Furthermore, it is arranged in such a way that the amplifier, which is switched to a degree of amplification, only accounts for a lesser part of the total required amplification. The total amplification is namely divided into amplifiers with fixed amplification and, in series with these, amplifiers with said gradual amplification control.

Additionally, a low instrument cost has been provided by using a single terminal amplifier unit for both signals, which are periodically connected to the pre-amplifier. By arranging several adjustable amplifiers in series, a large number of amplification steps and thereby an accurate adjustment may be achieved through different combinations of amplification steps of the amplifiers connected in series.

All the functions required for measuring the kVp-value, i.e. determination of the respective main voltage levels, setting of the switches, computation of the ratio and generation of the correct measurement value are executed by the use of a micro-processor giving a high computation accuracy.

The latter arrangement, together with a very quick measurement cycle in the instrument by the method according to the invention creates the possibility of arranging the instrument for measurement of more values and characteristics than the kVp-value. This will be described below in conjunction with the description of the embodiment of the invention.

The invention not only enables a very exact measurement through a quick measurement cycle, but also the possibility of using the same basic method and basic instrument solution in a series of instruments made for various kinds of measurements. It is also possible to make an instrument in which the included components may be controlled to carry out various kinds of measurements. Hereby, a multimeter for X-ray measurement may be created, so that only one instrument needs to be obtained and handled for this purpose.

BRIEF DESCRIPTION OF THE DRAWING

In the following, a preferred embodiment of the invention will be described. Reference is made to the accompanying drawing in which a block-diagram is shown of an instrument according to the invention.

DETAILED DESCRIPTION OF THE ILLUSTRATED EMBODIMENT

The block-diagram shown in the figure illustrates the operational principles of the instrument according to the invention. The elements of the instrument have been divided into four main blocks which are indicated by frames drawn with chain-dotted lines. The main blocks are: a sensor unit 1, a signal processing unit 2, a computation unit 3 and a data output unit 4. The output unit 4 is shown here as a digital display. Alternatively or as a complement, it may however be arranged in another way, such as in the form of a printer or for sending a control signal for automation of certain operational steps upon the X-ray exposure. The sensor unit 1 contains two metal filters 5 and 6, and behind these, photo-diodes 7 and 8. The photo-diodes 7, 8 are to be exposed to the X-ray radiation to be measured and which is indicated with the lines 9. In order to reach the photo-diodes 7 and 8 respectively, the radiation has to penetrate, under certain absorption, the filters 5 and 6 respectively. These have different absorbtion capacity, which may be achieved by having the filters made with different thicknesses as indicated in FIG. 1. In this way the energy that influences the photo-diodes 7 and 8 for generating a current, will have different levels. The ratio between these levels is used for computing the energy of the X-ray radiation.

If the photo-diode arrangements were to be the same, two signals would be obtained upon radiation, a stronger one from the photo-diode 7 and a weaker one from the photo-diode 8. However, the figure indicates that both arrangements consist of mutually varying numbers of photo-diodes: twice as many photo-diodes at 8 behind the filter 6, shown twice as thick as the filter 5 behind which the photo-diodes 7 are placed. Such an arrangement means that two equal instantaneous signal levels are obtained from both groups of photo-diodes. It is advantageous if this is the case, since one may then work with mutually, essentially-equal signal voltages, which tends to yield greater accuracy in the measurement result.

The computation in such an arrangement cannot be based on the direct ratio between the signals (ratio=1 at equal signal levels) since this ratio would not be representative of the ratio between the radiation levels. However, this may be corrected in the computation, which will be described later, by introducing a factor into the computation, said factor representing the difference between the two diode arrangements. The obtained signals are each sent to an amplifier 12 and 13 respectively. These amplifiers are of the current-voltage amplifier type and thus, after the amplifiers, voltages are obtained representing the absorbed radiation. The amplifiers provide the required main amplification.

From the pre-amplifiers the signals are transferred to an electronic, periodically-operating switch 14. By way of the switch, the signals from the photo-diodes 7 and 8 are brought alternately in short time periods, via the pre-amplifiers and further by means of a conduit 15, to an adjustable terminal amplifier unit 16. In the embodiment this consists of two amplifiers 17 and 18 connected in series. Both amplifiers are adjustable in several amplification steps with different degrees of amplification, as indicated by the groups 19 and 20. These groups consist of elements, for example resistors with different electrical characteristics, which decide the degree of amplification when connected. From the elements of the groups 19 and 20, one in each group may be connected per time period, which is achieved by switches 22 and 23 respectively (as a component they may also be called a multiplexer). By the connection in series of both switchable amplifiers 17 and 18, a large number of combinations with mutually different degrees of amplification may be achieved with a few amplifiers having a limited number of amplification steps.

For reasons given below, the adjustable amplification range of the terminal amplifiers is strongly limited by said allocation of the main amplification to the pre-amplifiers.

The relationship between the amplification in the pre-amplifiers and the successive terminal amplifier may be expressed as being in the order of magnitude of millions of times to a hundred times, i.e. in the order of magnitude 10 000:1 proportionally. In an advantageous embodiment, the amplification in the respective pre-amplifiers has been chosen to be 5 million times and 250 times in the terminal amplifier unit at the highest adjustable amplification.

Absolute figures or figure ranges cannot be given without defining at the same time, a certain design and method of measurement. The relationships described here should however give the person skilled in the art sufficient background to put the invention into practice and achieve its technical effect as it is described below.

After the terminal amplifier unit 16, the signal is sent via a conduit 24 to the computation unit 3. This, in turn, consists of a computer 25 and a calibration memory 26. The computer 25, in turn, includes an analogue-digital converter 27, a processor unit 28 for computation, control and storage and a communication unit 29.

Unique instrument data are stored in the calibration memory 26. The dependency of the signal-ratio on various radiation energies is registered here. Additionally, the amplification levels that are to apply for different amplification steps, computation- and control data, as well as adaptation of obtained terminal data into output format may be stored.

As indicated with lines and arrows in the figure, the communication unit 29 sends control data to the switch 14 and to the switches 22 and 23. The unit has a two-way connection with the calibration memory 26 and transfers output-data to the data-output unit 4.

This is here shown as a four-segment display 32 by means of which the correct kVp-value of the radiation is preferably shown or another value that the instrument is arranged to measure.

The processor unit 28 receives, via the analogue-digital converter, the incoming signal from the terminal amplifier unit 16 via the conduit 24. From this, control signals are generated in the processor for output via the unit 29, as well as the computed value for output to the output unit 4. Communication with the calibration memory also takes place via the communication unit. The computation unit 3 as a whole may be designed as a one-chip-computer.

The above description and figure describe a preferred embodiment. Variants of this embodiment may exist within the scope of the invention principle. Thus, the sensor unit is described with two filters only and corresponding photodiodes. Since, however, the X-ray radiation may vary within the plane of measurement, it may be suitable to divide the sensor elements in space, for example with two elements of each kind placed as four circle-sectors with alternating elements of each kind.

The switch 14 makes it possible to measure both signals with a single terminal amplifier unit, which simplifies the instrument. However, the instruments may function in accordance with the described principle also without the switch if a terminal amplifier unit is arranged for each of the signals.

From what should be understood from the above, it is important that the instrument can operate very quickly in the quick cycles that exist during an X-ray exposure. This naturally applies to the computer unit 25 and the switch 14 as well as the switches 22, 23. All these components may be designed to operate with such speed, that the required measurement speed is achieved. The distribution of amplification on pre-amplifiers and terminal amplifiers are highly important in order to obtain a quick cycle, so that the latter may operate with a low degree of amplification.

In addition to the instrument's equipment described and shown in the block-diagram, elements are included such as a battery for current supply or connection to an external current source, instrument casing, in-ports for input and output of test signals, main switches etc.

In a measurement cycle, the instrument operates in the following way, which corresponds to the method according to the invention:

When the instrument is switched on, and X-ray radiation (arrows 9) hits the filters 5 and 6, a signal current is generated in the photo-diodes 7 and 8 respectively, which due to the different thicknesses of the filters at the photodiodes 7 and 8 respectively, represent different radiation-energy levels. These two signal currents are amplified in the pre-amplifiers 12 and 13 and transferred as signal voltages to the switch 14. This alternately brings the two signals, in very short time periods via the conduit 15, to the terminal amplifier unit 16. From this, the processor 28 receives, via the conduit 24, the periodically alternating signals as digital signals after the analogue-digital converter 27. By contact with the control cycle for the switch 14 the processor is periodically informed as to which of the photo-diodes produces the respective signal sequences so that these may be processed separately.

The output value of the energy level is to be based, as mentioned, on the ratio between the signal intensity from the two photo-diodes with their different filters, whereby correction to any differing diode arrangement is made. In order for this computation to be executed with great accuracy and for a correct value to be fed out, the intensity level of the signal must be maintained within a limited range. The amplification of the signal must, in other words, be adapted in such a way that stronger signals above a certain maximum strength are amplified with such a limitation that they fall within the processing range of the processor, whilst weaker signals are further amplified to fall within the same range of operation. When such a signal adaptation is to be carried out, the units in groups 19 and 20 are switched with the switches 22 and 23 until such a degree of amplification has been reached, that will give a signal suitable for processing. This may take place with a common amplification level for both signals, but the best results and greater accuracy are achieved if each signal obtains a specific amplification. If the amplification for the two signals are different, the switches 22 and 23 must thereby operate in pace with the switch 14. If the pre-determined range of operation for the output to the processor tends to be exceeded or undercut during an exposure, the degree of amplification is adapted during the exposure cycle.

When the correct signal level is set in the processor, said ratio is computed and on the basis of this, a representative output signal is generated for controlling the data output unit 4. This takes place during gathering of control data from the calibration memory 26. It is of course also fundamental that the computer processing takes place taking account of the degree of amplification which is used after each control of the amplifiers for the two signals. If thereby, the measurement instrument does not operate fast enough, short exposures cannot be measured.

The alternating connection of the two signals to the same amplifier device results in a lower instrument cost. An additional step for simplifying the device is that two terminal amplifiers are arranged in a sequence which may be switched individually. Hereby, one may, with relatively few amplifiers, achieve a very large number of amplification steps with a suitable selection of degrees of amplification being multiples of the number of steps in each amplifier. It is furthermore possible to provide more than two amplifiers. Thus, one may, with simple mathematics, obtain a cost-optimised arrangement by choosing the dimension of the factors: number of steps, number of amplifiers and the degrees of amplification of the respective amplifiers.

An important device for accuracy and speed is, furthermore, the arrangement of the adjustable terminal amplifier apparatus immediately before the processor with only the analogue-digital converter therebetween. The pre-amplifiers operate with a fixed amplification and are situated before the terminal apparatus.

By locating the main amplification in the non-adjustable pre-amplifiers as mentioned, the amplification range within which the terminal amplifiers are to be adjustable, is decreased, which is of great importance for the speed of the adjustment cycle, which speed is imperative for the operational speed of the instruments. The larger the difference in signal intensities that the adjustable amplifiers would have to operate with, the longer time it takes to switch between the different amplification steps, since the signal in the previous amplification level needs more time to fade out and be replaced by the output signal at the new signal level, which is particularly noticeable when going from a higher to a lower signal level.

It is true that this concerns very short time periods, but in the present case it is still of importance for achieving the correct indication even with short exposure time. The reason for operating at shorter and shorter exposure times is that one wishes that the patient, who nowadays may be exposed to a large number of X-ray examinations, is exposed to the least possible amount of radiation.

Shorter exposure times are also made possible by faster film and more light-sensitive electronic means respectively.

A digitally operating processor has been chosen for the instrument, having digitally operating connected units for the signals generated in analogue cycles. Hereby, a quick processing with large computation capacity and excellent possibilities for control and calibration via a large capacity-memory may be achieved. In a digital manner of operation however, obtained values are presented in steps, whose number within the processing area, and thereby height, is determined by the size of the ADC given by the number of bits. It is suitable to use an 8-bit ADC which is commonly available in component form at a low price. The number of steps will thereby be 256.

It is thereby understood that the height of the steps in a percentage relationship compared to the presented number is greater at a low number than at a high number within the area of operation. It is thereby important that the processor may work with as large numbers as possible, which may be achieved by adapting the degree of amplification of the incoming and then digitalized signals. The greatest accuracy in total is thereby achieved if both signals can be individually adapted to fall within the high number range. This may be achieved with the method and the instrument according to the invention through the fact that the two incoming and alternately connected signals to the amplification apparatus may be amplified individually. It is thereby also advantageous to adapt these from the very start to the same signal level despite the two filters with different degrees of absorption. The arrangement to achieve this has been described earlier.

In the foregoing description, as well as in the accompanying patent claims, two photo-diode units and two generated signals are mentioned, as well as a ratio computation on the basis of said signals. It is also established practice to work in this way, but this does not exclude that the matter described here also applies to embodiments with more photo-diode units and possibly more complicated methods of computation in as much as the present invention is applied in these cases.

It has also been described here how, with the very fast-working amplifiers, in an instrument, the level of the energy in the X-ray radiation may be received and measured by means of the sensor unit. In the following, it will be described how this possibility may be used for measuring different measurement parameters, namely actual kVp, dose, exposure time and for plotting the energy-level curve for an exposure.

Measurement of the kVp

Here, the digitally operating processor is arranged to register and feed out the value for the energy level when this assumes a peak value, whereby the control is such that the value above a certain level is registered. Often, the energy level may instantaneously rise above the determined energy level and one thus obtains several instantaneous values, which may be labelled as peak values. In general, therefore, a sampling of these values is made in order to give a registration, which is correct for use in setting the X-ray apparatus, so that desired blackening and contrast may be achieved upon the successive film exposure or picture registration with an electronic screen. As mentioned, the kVp value is obtained by computing the ratio between the signal current from the photo-diodes with their differentiated filtration.

On feeding out the value, direct instructions for the setting of the X-ray apparatus may be given instead of, or parallel to, the kVp value. The signal representing the registered value may even be used for a direct control of the setting of the X-ray apparatus, something which however does not fall within the present task to be presented in greater detail.

Measurement of X-ray Dose

The dose of X-ray radiation upon exposure is correlated to the integrated value of the energy levels within the total exposure. Since the fast-working amplifiers may handle measurements of the signal levels following closely after one another, it is possible to produce a correct value for the dose by sampling the result of these measurements. The digital processor is arranged in such a way that successive signal levels in a periodically tight time sequence are sampled during the entire exposure, largely independent of height and added in the processor, with the results converted to a correct value for the dose, so that this may be presented in a displaying or printing output.

As initially mentioned, it has been found that the dose-value should correspond to the ability of the radiation dose to ionize air. This ability is however not directly proportionally correlated to the integral of the measured energy levels. Thus, since no linearity exists within the measurement range for the dose, when measured with semiconductor sensors and ion chambers respectively, whose measurement value is considered representative for the desired measurement value of the ability to ionize air, a compensation must be made for the non-linear relationship between the two methods of measurement, when different measurement results are obtained.

In conjunction with the conception of the present invention, it has been noted that the following measurement method creates a possibility of achieving such a controlled compensation:

During the measurement cycle, the signals from the different sensors with their different filtration are registered, not as ratios representing the energy level of the radiation as is the case in kVp-measurement, but rather in such a way that the successive measurement values are registered separately, representing the radiation intensity from the respective sensors, whereafter integrals for these measurement theories are calculated. By additionally computing the ratio between these two integrals, a number is obtained. This may, in a translation table or by way of an algorithm, be related to a number, presenting the dose expressed in terms of the ability to ionize air. By designing the processor for control and computation according to the described method, one may thus obtain measurement values that may be directly related to the corresponding measurement values according to the accepted way of expressing the size of an X-ray dose.

Said algorithm or table with numbers for comparison, is suitably programmed into the memory of the processor. Hereby, the processor may be controlled to not present said number representing the ratio of the integrals, but rather to translate it into the number representing the ability to ionize air and present the same.

This has not been possible in the same way in previously known instruments base on semiconductors, since the measurement method based on the design and control of these instruments does not result in values that are directly related, in a clear way, to the corresponding values representing the ability to ionize air.

Measurement of the Time Duration of the Exposure

As mentioned, it is common practice to express the time duration of the exposure as the time period starting from the point where the signal has achieved 75% of the kVp-value, or the mean level of several sampled peak values, until the signal has fallen to 75% of this value. There are no particular problems in registering a time duration with the instrument and by means of the digital processor. By means of the processor for the kVp-measurement, no problems arise, after the kVp-value has been registered, to also register, at the end of the exposure, when the 75% level is reached. As a basis for determining this level, the kVp-value registered immediately before, may be used. However, the moment when the energy level reaches 75% of the kVp-value at the start of the exposure may not be determined without, as a basis, having determined what the successive kVp-value will be. This may be solved in two alternative ways:

In the first way, one decides the kVp-value that will occur during the exposure, before measurement of the exposure time. If the operator has knowledge from previous exposures and measurements of which kVp-value may be expected, this may manually be included as a basis for the determination of the moment when the 75% is reached. It is also possible to design the instrument for storing this value, so that it is available in the processor as a basis for registration of the time duration.

In the second way, no such previous knowledge is required about the kVp-value that will occur. This is achieved at the start of the exposure by measuring and storing a large number of values and registering the moments in time, at which they occur. At the termination of the exposure it may be determined which of the measured initial levels corresponds to 75% of the finally measured kVp-value, by means of the kVp-value measured during the exposure. The processor is then arranged to use the moments in time for this determined 75% value as a starting moment for registration of the time duration up to the time when the 75% level has been reached at the end of the exposure.

Registration of Curve-Shape

The described instrument is shown and has been described as presenting output data on a display. It has also been mentioned that the instrument alternatively or complementarily may be connected for a printing output. If one wished to register the curve-shape for the successive energy levels during the exposure, this may of course not be made via a display. However, a printer may be connected for registration of a curve-shape, and alternatively, a connection may be made to an oscilloscope.

When reading the curve, the processor is set to control the measurement process for the execution of a large number of instantaneous measurements of the energy level during the exposure. These values are stored in such a way that a corresponding curve may be produced in a printer or on a cathode-ray screen.

Here, a method and an instrument for measurement of energy levels during X-ray exposure have thus been described. The solution according to the invention allows the measurements to be made at such short time intervals, that a large number of measurement steps can be executed within a short exposure time. Following control of the measurement process via the digital processor as well as registration and computer processing of the resulting values, the instrument may be adapted for measurement of several different values of interest in the context which has been described above.

I claim:

1. A method of measuring X-ray radiation, comprising:
   receiving the radiation by at least two photo-electric units at the time of measurement, each unit receiving the radiation after passage through filters having mutually different degrees of absorption, two radiation levels with different energy affect the units;
   generating electric signals representing the radiation received by said units; and
   computing a radiation energy value which corresponds to a ratio between the electric signals generated by the units, said computing step comprising:
   adapting signal intensity of said signals to a predetermined processing range, said range being less than a total intensity value associated with the signals generated in response to the radiation, said step of adapting being carried out by means of an amplifier device having an adjustable degree of amplification, and by varying the degree of amplification in order to give the signals an intensity within said processing range by sensing signal intensity after the amplifier device, wherein a first amplification of the signals is effected in a pre-amplifier maintained at a degree of amplification which is fixed in order to obtain peak values of said signals, and then in a terminal amplifier, whose degree of amplification is adjusted to give the signals said intensity adapted to the processing range.

2. The method according to claim 1, wherein the first amplification of the respective signal is effected in the respective pre-amplifier and to a lesser extent in the successive, adjustable terminal amplifier at a ratio between the degrees of amplification in the range of 10 000:1.

3. The method according to claim 1, wherein both signals are sent to a single terminal amplifier in an alternating sequence by means of a periodically operating switch.

4. The method according to claim 1, wherein measurement during an exposure is executed on several occasions in a pre-determined time sequence with registration of values exceeding a pre-determined level and that these obtained measurement values are compiled to form a measurement result representing a pre-determined measurement parameter, including kVp, X-ray dose, exposure time duration and/or curve shape.

5. The method according to claim 4, wherein a series of successive measurement values from the two photo-electric units are registered separately and sampled to form separate integrals for the radiation intensity measured during the exposure, the ratio between these integrals are computed, and said ratio is transferred to a corresponding value representing the ability of the X-ray dose to ionize air, which value is used as the end result of dose measurements.

6. An instrument for measuring X-ray radiation comprising two photo-electric units each arranged to receive the radiation after its passage through filters for mutually different degrees of absorption, two radiation levels with different energy affect the units, an amplifier device connected to the photo-electric units and arranged for a variable amplification of two signals generated by said units to represent said radiation levels, and a data processing unit for generation of a value representative of the radiation energy value and based on a ratio between radiation energies received by the photo-electric units, and an apparatus for outputting said value, wherein the amplifier device comprises pre-amplifiers having fixed degrees of amplification and a terminal amplifier in series therewith having adjustable degrees of amplification, the pre-amplifiers being arranged to provide a substantial portion of the required total amplification and to obtain peak values of said signals.

7. The instrument according to claim 6, wherein each pre-amplifier is arranged to have a degree of amplification amounting to about 10 000 times the amplification in the successive terminal amplifier, with an amplification in the pre-amplifier in the range of 5 million times.

8. The instrument according to claim 6, wherein the terminal amplifier comprises several amplifiers connected in series, so that a large number of different amplifications is obtained through different combinations of the degrees of amplification in the different pre-amplifiers.

9. The instrument according to claim 6, wherein only one terminal amplifier is provided and that a switch is arranged to alternately connect the signals from the two photo-electric units, and that the data processing unit is arranged to alternately process the two signals during their respective time of connection.

10. An instrument according to claim 6, wherein the two photo-electric units with regard to their signal generating ability on the basis of received radiation energy through filters respectively, are arranged to form essentially equal signal intensities, the data processing apparatus being arranged to form said ratio on the basis of the amplitudes of the signals with compensation for the different photo-electric units.

11. The instrument according to claim 6, wherein the data processing unit is arranged to achieve measurements at several instances during an exposure in a pre-determined time sequence, and arranged to register the measurement values exceeding pre-determined level and to compile obtained measurement values in order to form a measurement result representing a pre-determined measurement parameter, including kVp, X-ray dose, exposure time duration and/or curve shape.

12. An instrument according to claim 11, wherein the data processing unit is arranged to separately register a series of successive measurement values from the two photo-electric units and sample them to form separate integrals for the radiation intensity measured during the exposure, said data processing unit adapted to compute the ratio between these integrals, and to transfer this ratio according to data stored in the data processing unit to a value representing the ability of the X-ray dose to ionize air, for using this value as an end result of dose measurement.

* * * * *